(12) United States Patent
Grasshoff et al.

(10) Patent No.: US 7,047,231 B2
(45) Date of Patent: May 16, 2006

(54) GETPAGE-WORKLOAD BASED INDEX OPTIMIZER

(75) Inventors: Hans-Peter Grasshoff, Langenfeld (DE); Jörg Klosterhalfen, Cologne (DE); Guido Breuer, Hilden (DE)

(73) Assignee: Software Engineering GmbH, Düsseldorf (DE)

( * ) Notice: Subject to any disclaimer, the term of this patent is extended or adjusted under 35 U.S.C. 154(b) by 666 days.

(21) Appl. No.: 10/273,976

(22) Filed: Oct. 18, 2002

(65) Prior Publication Data

US 2003/0167255 A1 Sep. 4, 2003

Related U.S. Application Data

(60) Provisional application No. 60/360,911, filed on Mar. 1, 2002.

(51) Int. Cl.
*G06F 17/30* (2006.01)

(52) U.S. Cl. .......................................... 707/2; 707/102
(58) Field of Classification Search .................. 707/2, 707/102
See application file for complete search history.

(56) References Cited

U.S. PATENT DOCUMENTS

| | | | | |
|---|---|---|---|---|
| 5,404,510 | A | * | 4/1995 | Smith et al. ................ 707/2 |
| 6,006,232 | A | * | 12/1999 | Lyons ...................... 707/101 |
| 6,182,079 | B1 | | 1/2001 | Lenzie |
| 6,314,420 | B1 | * | 11/2001 | Lang et al. ................. 707/3 |
| 6,662,175 | B1 | * | 12/2003 | Ghazal et al. ............... 707/2 |
| 6,728,720 | B1 | * | 4/2004 | Lenzie .................... 707/101 |
| 6,842,753 | B1 | * | 1/2005 | Chaudhuri et al. .......... 707/10 |
| 2003/0093408 | A1 | * | 5/2003 | Brown et al. ............... 707/2 |
| 2003/0115183 | A1 | * | 6/2003 | Abdo et al. ................ 707/3 |
| 2004/0003132 | A1 | * | 1/2004 | Stanley et al. ............ 709/316 |

FOREIGN PATENT DOCUMENTS

EP     1065606 A2    1/2001

OTHER PUBLICATIONS

Gary Bronziet; "Index optimization white paper"; published by: Cogito Limited, Chislehurst, Kent, U.K.; Jul. 7, 2000; 13 pages.
Gary Bronziet; "Index Design Analysis—Why and How?"; The Idug Solutions Journal; May 1, 2001; 3 pages; vol. 8, Issue 1; publisher: International DB2 Users Group, Chicago, USA.

* cited by examiner

*Primary Examiner*—Wayne Amsbury
(74) *Attorney, Agent, or Firm*—Epstein Drangel Bazerman & James, LLP

(57) ABSTRACT

The index optimization (XOP) program is a method to recommend new or improved performance indexes for use by an IBM mainframe DB2 database server for a given set of SQL statements. The recommendations are calculated based on a single call of the DB2 optimizer for each SQL statement with the existing index set, parsing of the SQL statements, the filter factors of the SQL statement predicates, and the getpage workload of an SQL statement. The getpage workload of an SQL statement is the read/change activity on each table and each index currently used for all invocations of an SQL statement. The XOP program computes new and improved performance indexes based on the getpage workload of all relevant SQL statements and does not use the DB2 optimizer to determine the usefulness of potential indexes.

25 Claims, 13 Drawing Sheets

US 7,047,231 B2

GETPAGE-WORKLOAD BASED INDEX OPTIMIZER

This application claims priority of pending U.S. Provisional Patent Application Ser. No. 60/360,911, filed Mar. 1, 2002.

FIELD OF THE INVENTION

The present invention is an index optimization (XOP) for IBM mainframe DB2 database servers and the like. More specifically, the invention relates to an index recommendation program that is based on relevant SQL statements and their getpage activity as monitored by a DB2 trace for a representative period of time.

BACKGROUND OF THE INVENTION

A DB2 database on an IBM mainframe server is a relational database management system. In a relational database, data is stored in one or more tables, each containing a specific number of rows. The rows of a table are divided into columns. Rows can be retrieved and manipulated at the column level. The language for DB2 data retrieval and manipulation is SQL (Structured Query Language). Instructions to the database for either retrieval or manipulation are hereinafter referred to as SQL statements or more generally, as queries. The major SQL operations commands are SELECT, INSERT, UPDATE, and DELETE. The performance of SQL statements can be enhanced through the use of indexes in accessing the rows in the DB2 tables more efficiently. An index is an ordered set of pointers to the data in the table i.e., it orders the values of columns in a table. Indexes are stored separately from the data. The decision on whether and how to use an existing index for a given SQL statement that retrieves/manipulates table data is made internally by the IBM DB2 optimizer. This decision is called the access path of an SQL statement. The access path and the performance of an SQL statement are directly related to index design. In large-scale production environments, thousands of tables may exist. Normally, index design is a manual process that includes estimates rather than actual production activity. The manual process of index design in such an environment is both inefficient and slow.

An SQL statement is internally subdivided into one or more query blocks by the IBM DB2 optimizer. Every query block has its own access path with one or more tables and may use one or more indexes, e.g., the query SELECT*FROM TAB1 UNION SELECT*FROM TAB2 consists of 2 query blocks SELECT*FROM TAB1 and SELECT*FROM TAB2. Other examples of query blocks are VIEW or SUBSELECT MATERIALIZATION. The query blocks and their selected access paths of SQL statements can be analyzed using the EXPLAIN interface of DB2.

Statistical data about the tables and indexes are a major influence on the access path of an SQL statement selected using the IBM DB2 optimizer. The DB2 catalog is an internal set of tables of data about a DB2 database including information on tables, columns, indexes, key columns, and SQL statements.

Buffer pools, also known as virtual buffer pools, are areas of virtual storage in which DB2 temporarily stores pages of data from tables and indexes. When an SQL statement requests rows of a table, the DB2 data manager retrieves the pages containing the rows of the table from the DB2 buffer pool manager. The number of pages retrieved for a table or index to satisfy an SQL statement is the "getpages" for the table or index.

The getpages measured in the buffers of the DB2 database server are always the same for an SQL statement and a given set of indexes on the tables referenced by the SQL statement, regardless of the state of the DB2 database server and the machine. In this regard, getpages are different from disk I/Os which may vary for the same SQL statement at different times.

Predicates are located in the WHERE, HAVING and ON clauses of SQL statements and describe attributes of table data. To reduce the table getpage activity, the IBM DB2 optimizer internally uses predicate filter factors to determine which index is best. Each such index can serve one or more columns of a table. A filter factor is a floating value between 0 and 1 that describes the proportion of rows in a table for which the predicate is true. It is supplied by the IBM DB2 optimizer EXPLAIN interface and stays the same regardless of the indexes deployed, i.e., filter factors are static for the predicates of a given query. A predicate with a small filter factor, i.e., close to zero is very effective because it selects only a few rows out of all rows in a table. A predicate with a high filter factor, i.e., close to 1, is very ineffective since it encompasses most rows in the table.

The following list shows the input data to the present invention. The abbreviations on the left hand side will be used herein:

Q SQL statement
T Table
B Query block
P Predicate
FF Filter factor of a predicate
Getp(T,Q) Number of getpages (equates to number of pages read) for table T for all invocations of SQL statement Q (regardless whether Q is a SELECT, UPDATE, INSERT or DELETE statement)
Getp(I,Q) Number of getpages (equates to number of pages read) for index I for all invocations of SQL statement Q (regardless whether Q is a SELECT, UPDATE, INSERT or DELETE statement)
Update(T,Q) Number of pages changed in table T by all invocations of an UPDATE statement Q
Insert(T,Q) Number of pages changed in table T by all invocations of an INSERT statement Q
Delete(T,Q) Number of pages changed in table T by all invocations of a DELETE statement Q
Col(T,Q,B)={$C_1, \ldots, C_n$} is the set of columns within table T and SQL statement Q and query block B
Pred(T,Q,B)={$P_1, \ldots, P_n$} is the set of predicates in SQL statement Q and query block B with a column in table T
All indexing n, such as $P_n$, should be understood as a generic placeholder that differs for each table, index and query block.

SUMMARY OF THE INVENTION

The present invention describes an index recommendation XOP program that computes new and improved performance indexes based on the getpage workload of a given set of SQL statements. The term getpage workload of an SQL statement is defined as the read/change activity (measured in getpages) on each table and each index currently used for all invocations of an SQL statement. The results of the XOP program are pure computations; the XOP program itself does not use the DB2 optimizer to determine the usefulness of potential indexes.

DETAILED DESCRIPTION

Information About Giving Activity

Figure 1:
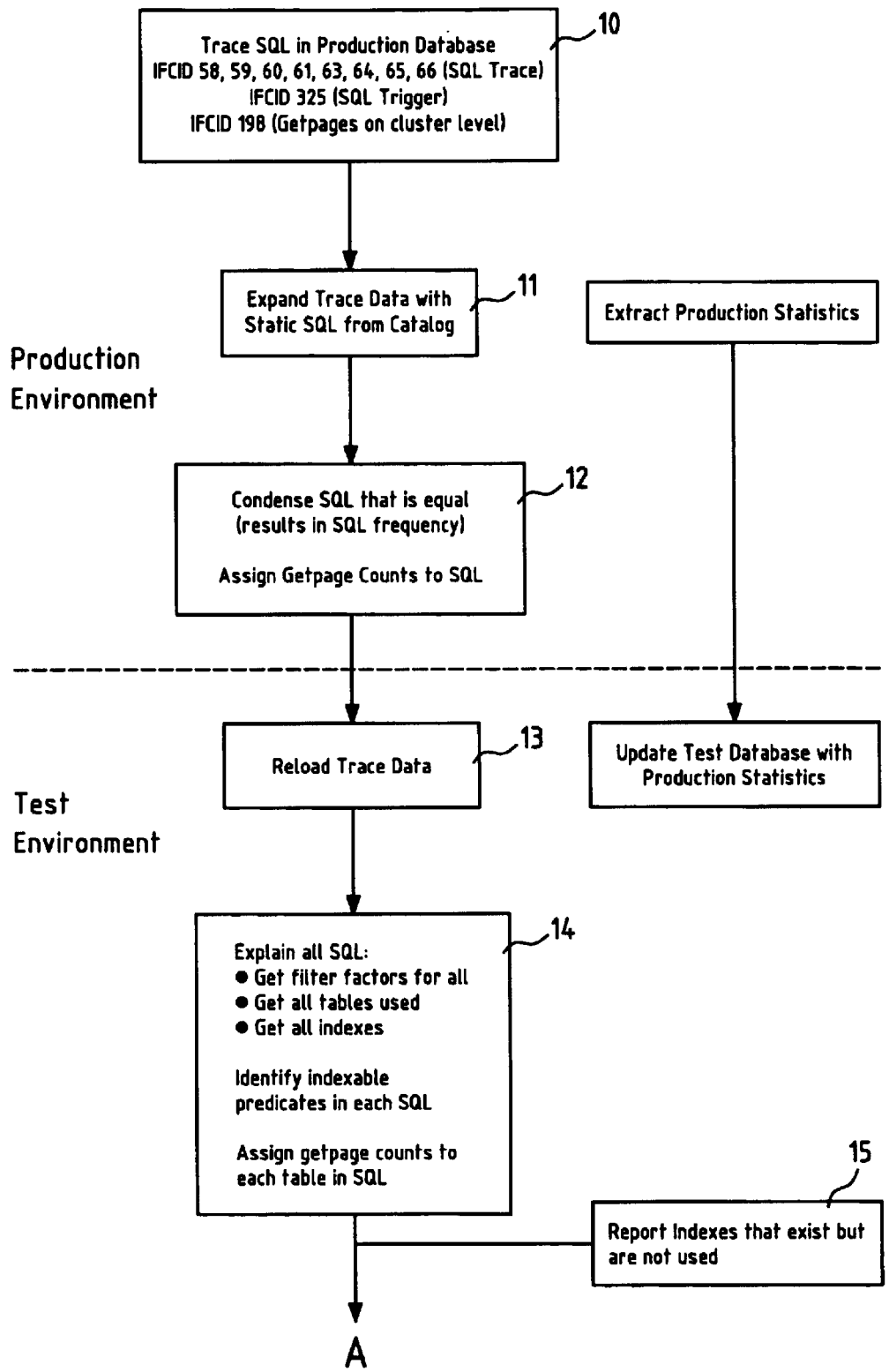
FIG. 1 is the first page of the flowchart of the overall processing by the XOP program.
Figure 2:
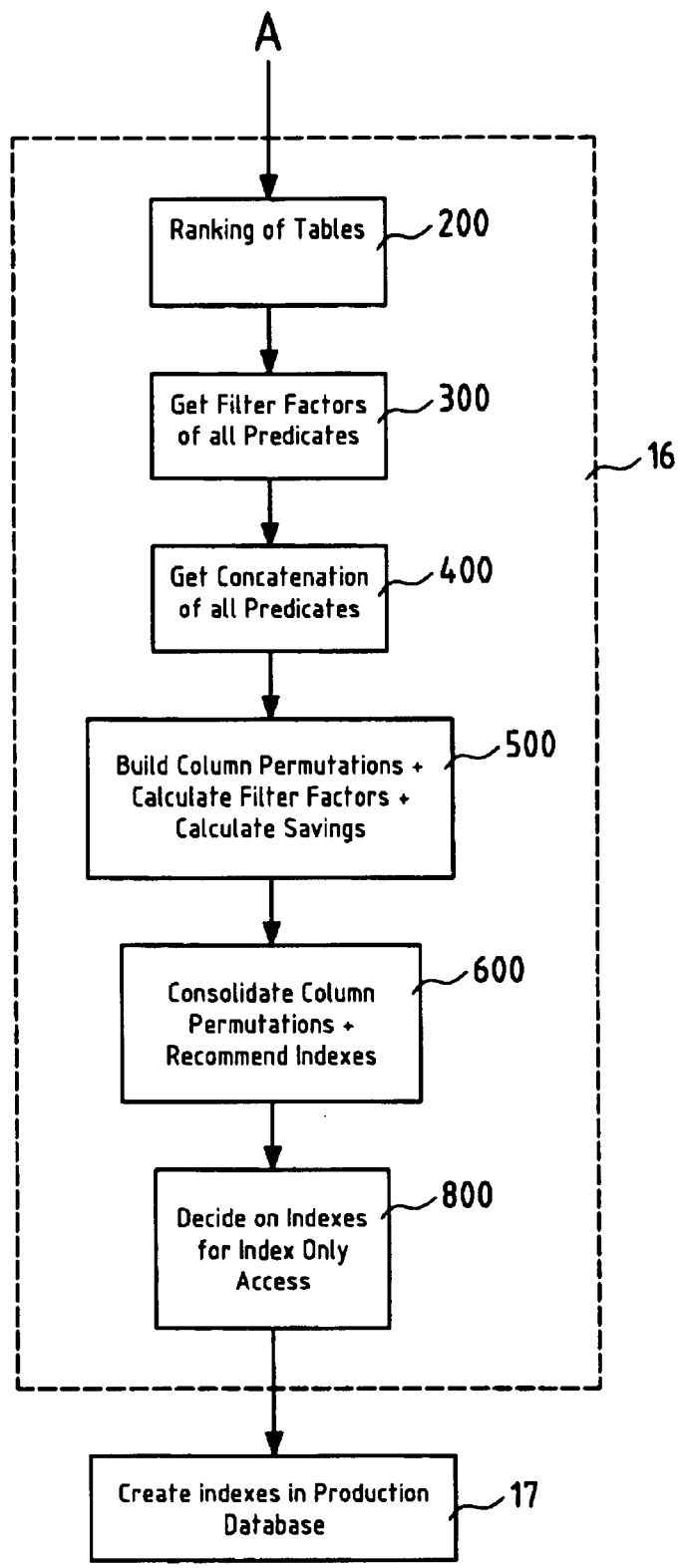
FIG. 2 is the second page of the flowchart of the overall processing by the XOP program.

FIGS. 1 & 2 form a high level flowchart of the XOP program. For a given set of SQL statements, the programs major objective is to recommend new or improved performance indexes based on their ability to minimize the overall SQL statement getpage workload i.e., the read/change activity on each table and each index currently used for all invocations of an SQL statement.

The initial step to running the XOP program is to extract production statistics from the existing database. A conventional DB2 trace is also run in the production environment 10. This captures SQL statements and their getpage activities on the tables and index levels for a representative time interval. The trace data is expanded with static SQL from the database's catalog 11 and condensed to give the SQL frequency and to allow assignment of getpage counts to the SQL 12.

The test environment consist of corresponding tables and indexes to those in the production environment, but no data is required to be in the tables. The trace data is reloaded into the test environment 13. Production catalog statistics must be simulated in order to do a one time EXPLAIN of the relevant SQL statements. The EXPLAIN function of DB2 is used to provide the access path for each query block, the predicate filter factors, and the tables and indexes used by the relevant SQL statements. As a direct result, a comparison of indexes that exist with the ones being used, allows identification of the indexes currently not used 15. Next the program identifies the indexable predicates in each SQL, it then assigns a getpage count to each table in the SQL 14.

The actual selection of indexes to be used in the production database is done through a series of steps 200–800 which will determine the XOP selection process 16. As more fully discussed below, the tables are ranked 200, filter factors are obtained for all predicates 300, concatenation for all predicates as obtained 400, column permutations and filter factors and savings are calculated 500, column permutations are consolidated and indexes recommended 600, indexes for index only access are selected 800. Upon completion the recommended indexes are used to create indexes in the production database 17.

Figure 3:
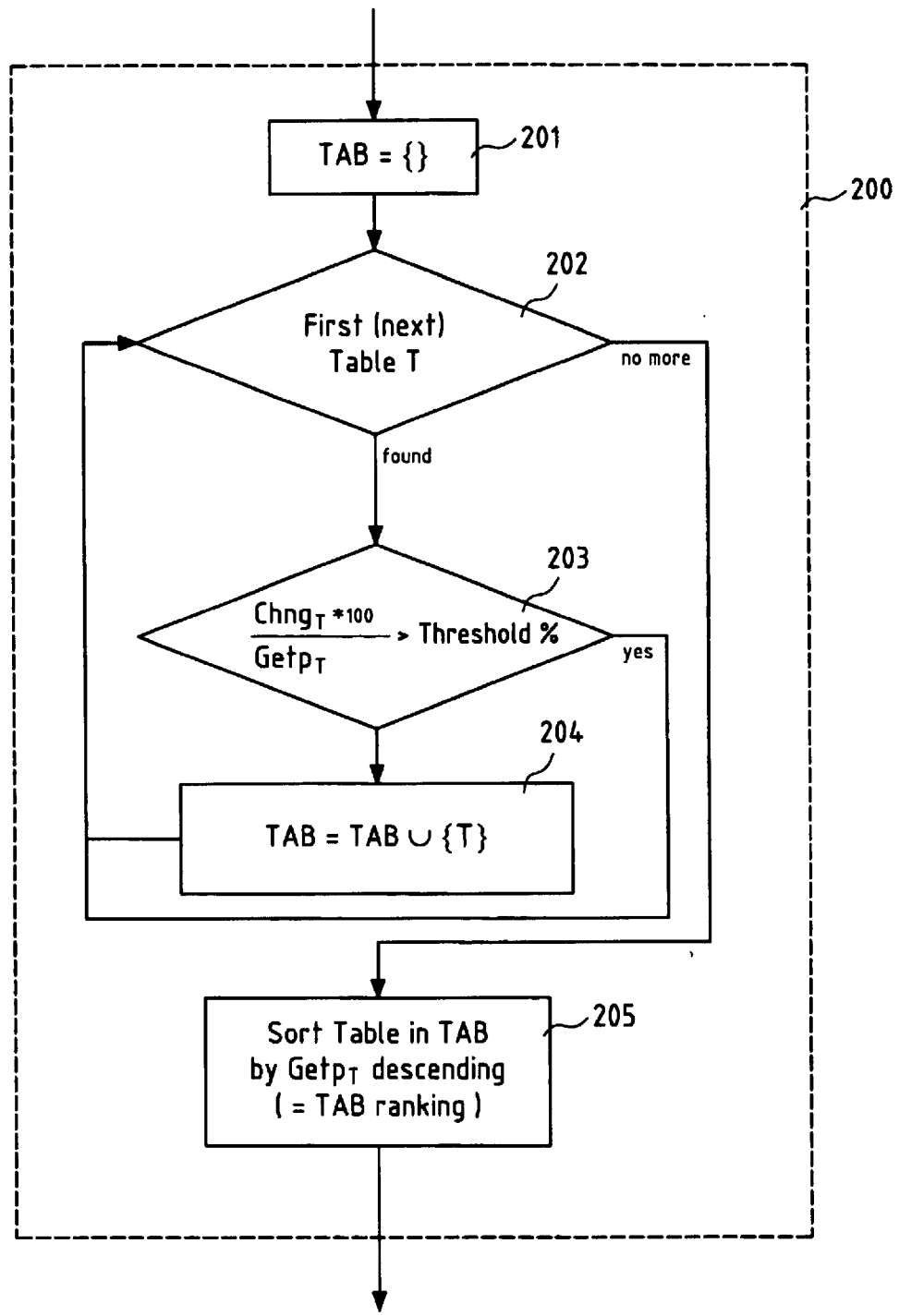
FIG. 3 is a flowchart of the table ranking for index recommendation.

FIG. 3 illustrates the process of ranking tables. This ranking identifies the tables most likely to benefit as a result of new performance indexes. A set of tables TAB is introduced in the first step and initialized to empty 201. Then each table T 202 is checked whether its read activity $Getp_T$ exceeds the change activity $Chng_T$ by a predefined threshold percentage 203. A table T with a high volume of changed data is not considered for further processing because additional indexes on table T increase the change activity $Chng_T$ to an amount that is higher than the savings in read activity $Getp_T$. Otherwise, table T is added to the set of tables TAB 204 which collects all tables for ranking.

The read activity $Getp_T$ of a table T is defined as the total sum of getpage requests of all SQL statement invocations for this table T:

$$Getp_T = \sum_{i=1}^{N} Gept(T, Q_i)$$

The change activity $Chng_T$ of a table T is the total sum of pages changed of all UPDATE, DELETE and INSERT statement invocations for this table T:

$$Chng_T = \sum_{i=1}^{n} \text{Update}(T, Q_i) + \sum_{i=1}^{n} \text{Delete}(T, Q_i) + \sum_{i=1}^{n} \text{Insert}(T, Q_i)$$

As one example, let a first SQL statement be SELECT*FROM TABA WHERE COLA="A" with a read activity of 100 pages and let a second SQL statement be INSERT INTO TABA VALUES ("A", "B", "C") with a read activity of 10 pages and a change activity of 100 pages. Let an additional one-column index using COLA reduce the read activity by half and double the change activity, then read activity is reduced to 50+5=55 pages and change activity is increased to 200 pages. The new overall workload is 55+200=255 pages which is an increase of 45 pages compared to the old workload of 100+10+100=210 pages.

Finally, all tables T in TAB are sorted by read activity $Getp_T$ in descending order 205. The result is a table ranking that lists the tables having a high potential for workload savings from new performance indexes.

Figure 4:
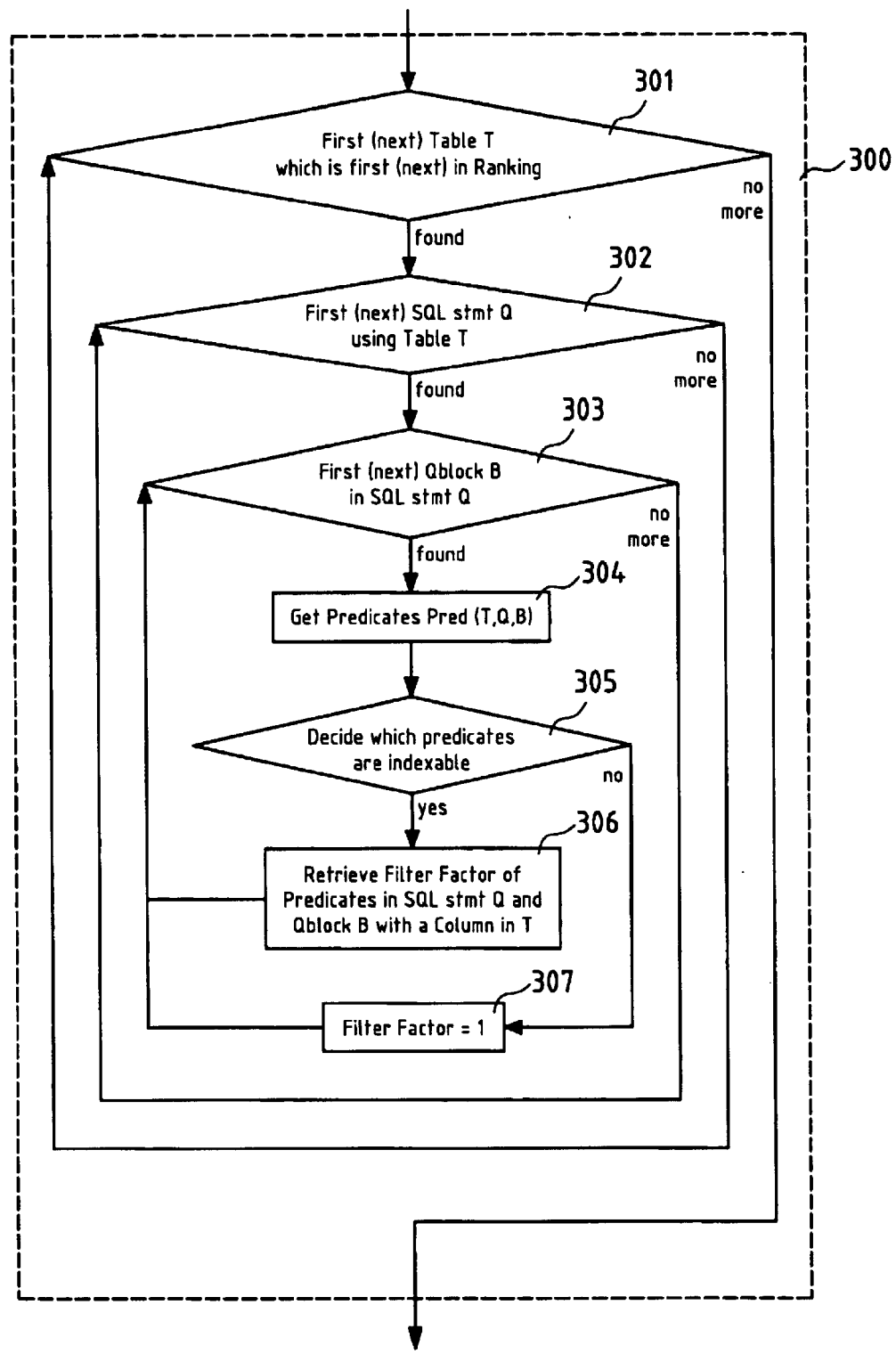
FIG. 4 is a flowchart showing the retrieval of the filter factors of the SQL statement predicates.

The flowchart of FIG. 4 shows the process of retrieving filter factors of all predicates. For each table T being processed in ranking order 301, for each SQL statement Q using this table T 302 and for each query block B inside this SQL statement Q 303, each predicate out of Pred(T,Q,B)= $\{P_{T1}, \ldots, P_{Tn}\}$ 304 is analyzed. If the predicate is not indexable 305, its filter factor is set to 1 which prevents this predicate from having any influence on future index recommendations 307. Predicates that do not have any table columns will receive a filter factor of 1. Examples for such predicates are special registers or constants.

Figure 5:
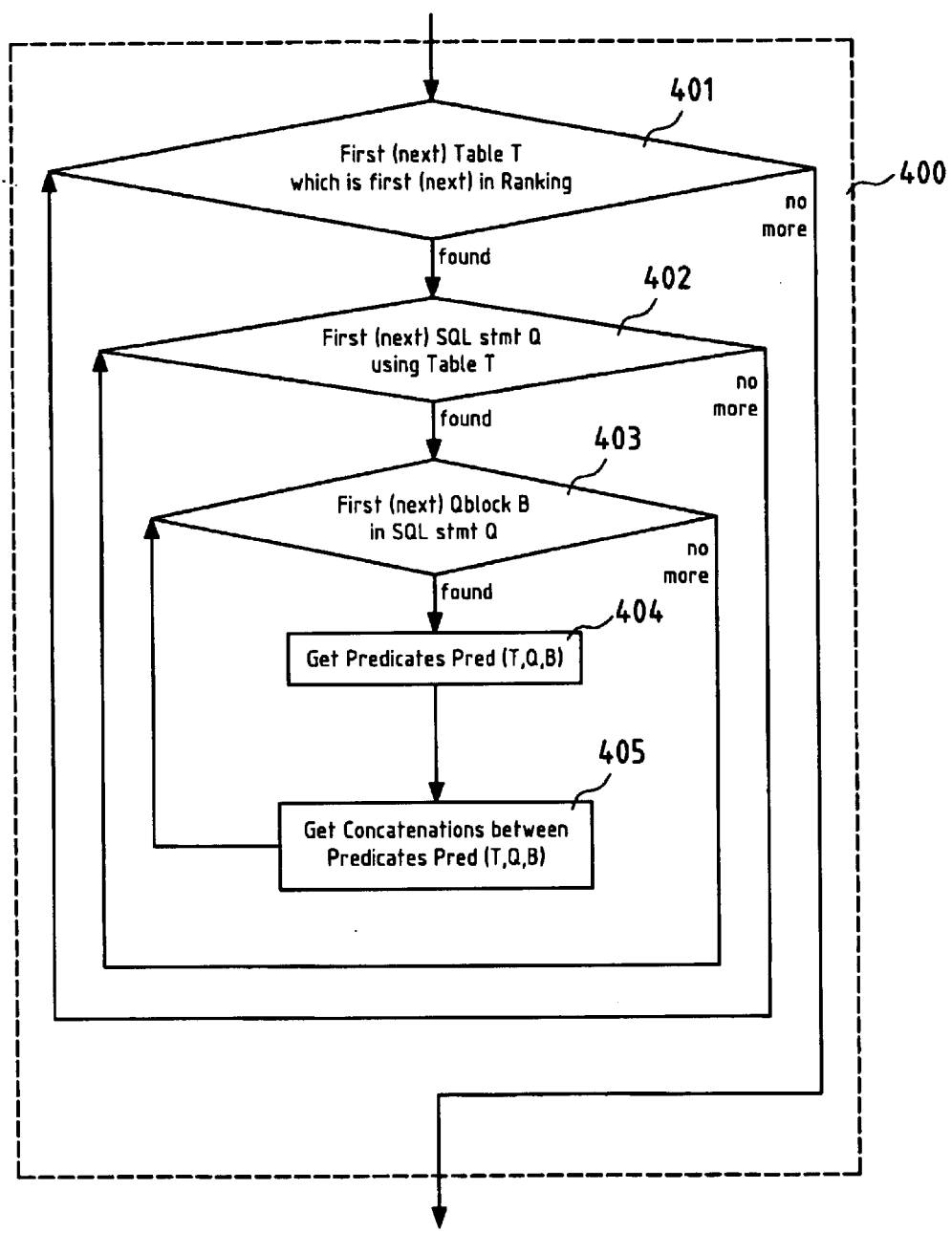
FIG. 5 is a flowchart showing the retrieval of the concatenations of the SQL statement predicates.

The flowchart of FIG. 5 illustrates the retrieval of the predicate concatenations, i.e., the boolean operators AND and OR. For each table T selected in ranking order 401, for each SQL statement Q using this table T 402, and for each query block B inside this SQL statement Q 403, each predicate out of Pred(T,Q,B)=$\{P_1, \ldots, P_n\}$ 404 is investigated to determine how it is concatenated to the next predicate and whether the next predicate in the concatenation of SQL statement Q belongs to Pred(T,Q,B), i.e., contains columns of table T 405. If no such columns are found, such predicates are replaced by TRUE and removed from the predicate expression using boolean rules. Note that expressions in inner brackets are evaluated first.

As an example, let a predicate expression be A=1 AND B=5 AND C=1 OR D=1 where A, B and D are columns of a first table and C is a column of a second table. Then the expression for predicate set {A=1, B=5, D=1} can be rewritten as A=1 AND B=5 AND TRUE OR D=1 which is equivalent to A=1 AND B=5 OR D=1.

Figure 6:
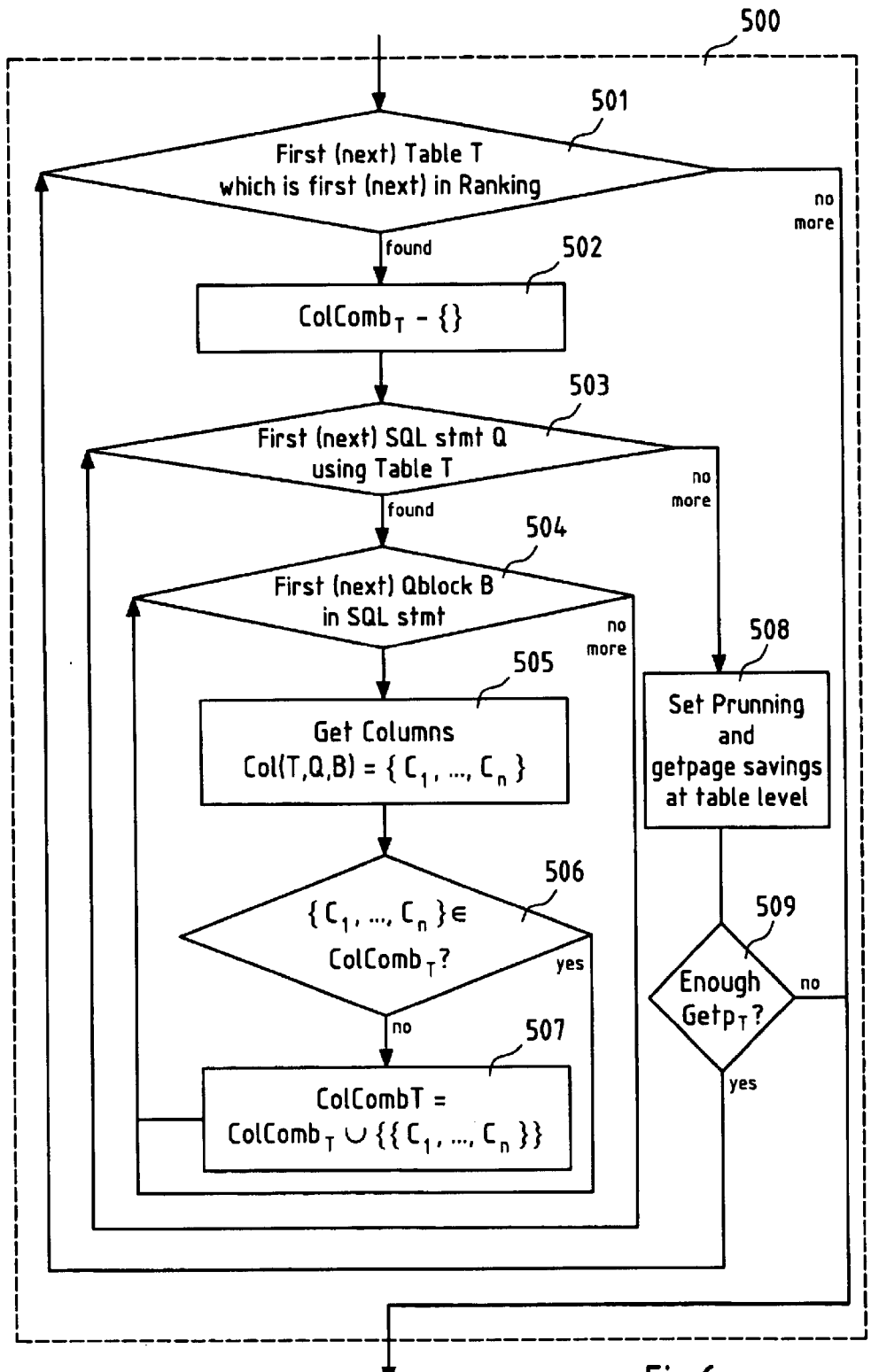
FIG. 6 is a flowchart showing the process of building column sets.

The next step of the program is shown in the flow diagram of FIG. 6. The objective is to build column sets that are input to the calculation of the total savings in getpages at table level for each column set permutation in a later step.

First, for each table T being processed in ranking order 501 a set of column sets $ColComb_T$ is introduced in a first step and initialized as being empty 502. Then, for each SQL statement Q using this table T 503 and for each query block B inside this SQL statement Q 504, the set of columns Col(T,Q,B)={$C_1, \ldots, C_n$} is checked to determine whether column set {$C_1, \ldots, C_n$} is already an element in $ColComb_T$ 506. If it is not, column set {$C_1, \ldots, C_n$} is added to $ColComb_T$ 507.

Figure 8:
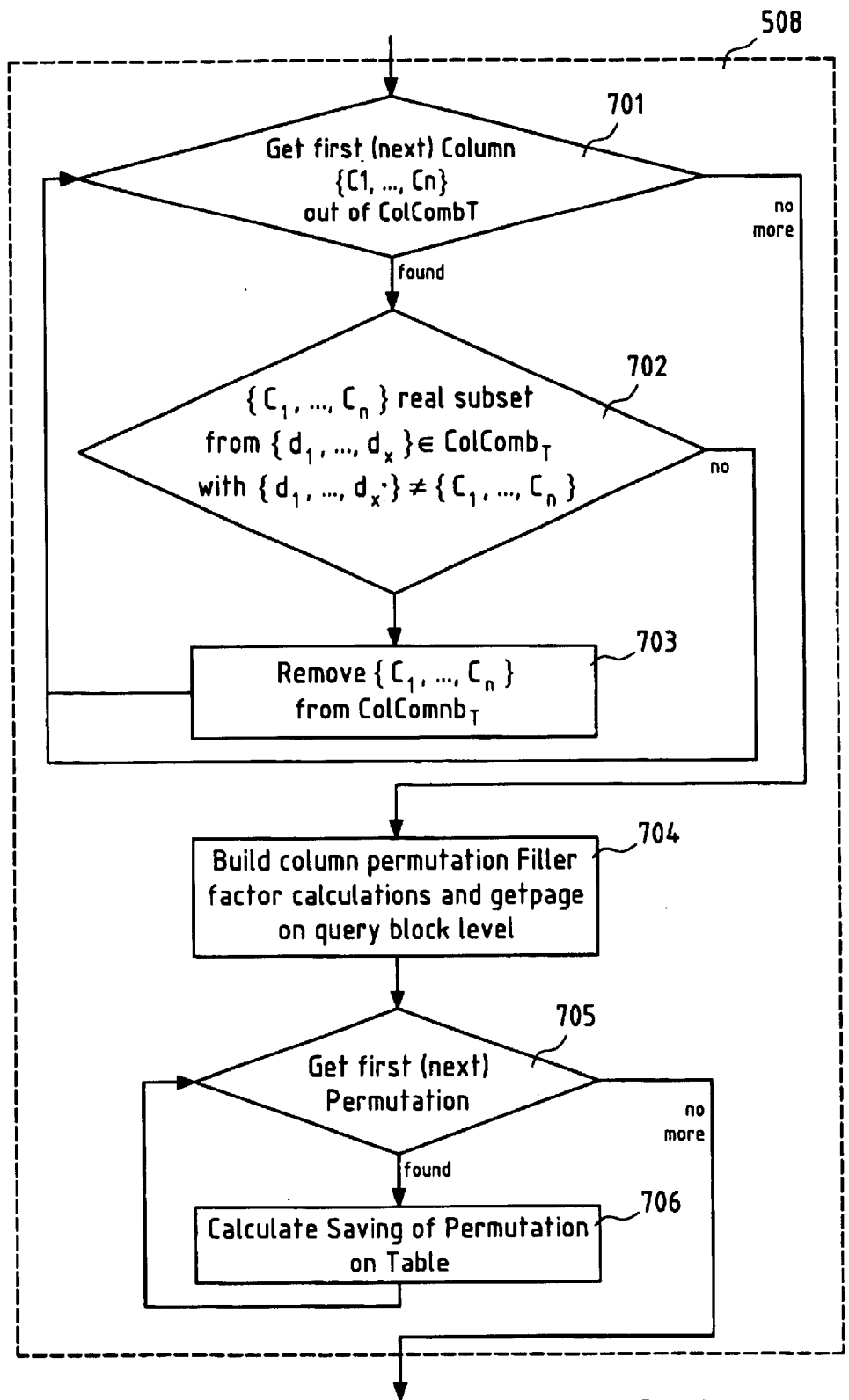
FIG. 8 is a flowchart of column set pruning and the calculation of the total savings in getpages on the table level for each column set permutation
Figure 9:
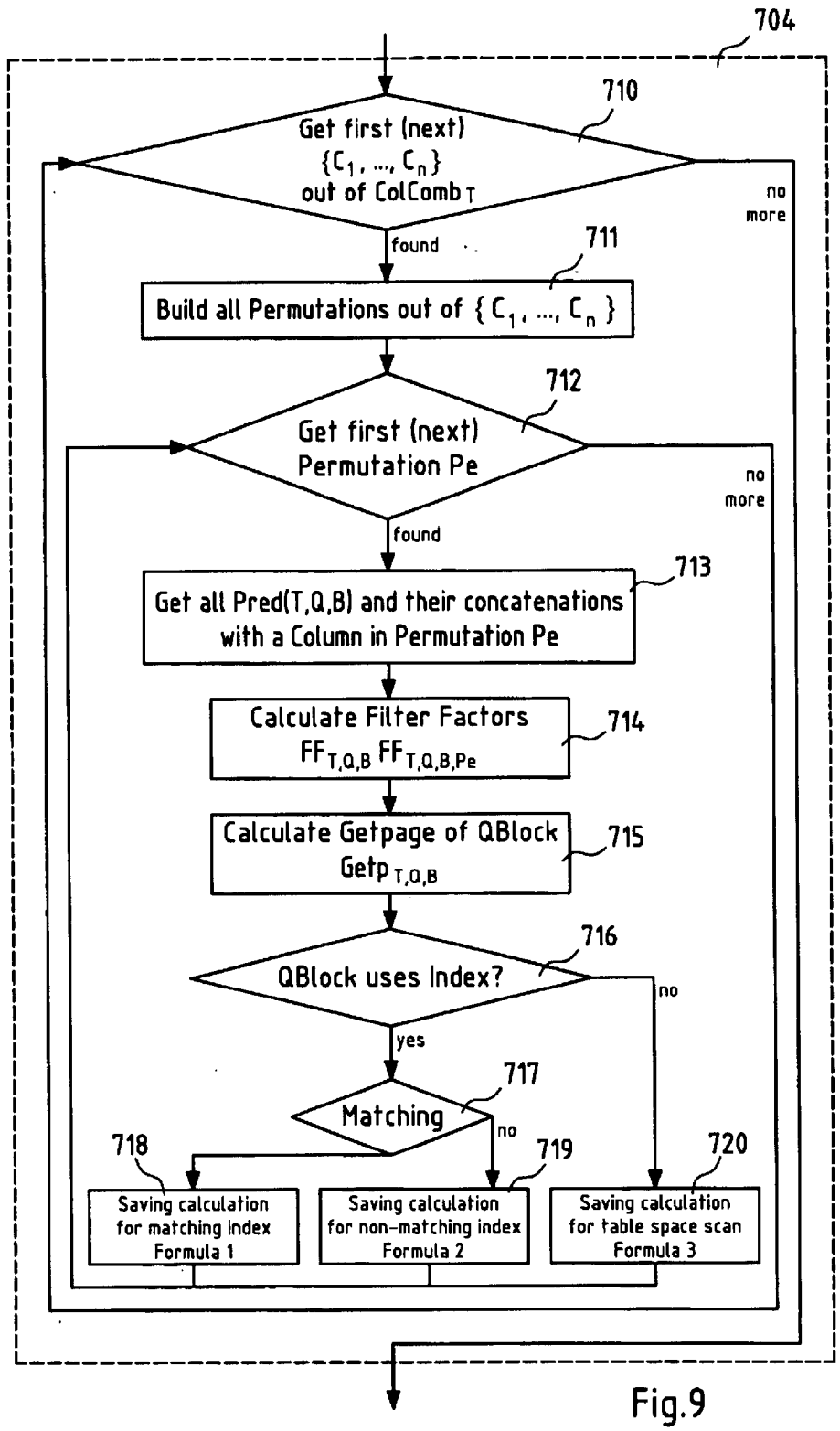
FIG. 9 is a flowchart of building column permutations and calculating their filter factors and savings in getpages on query block level.

When all SQL statements and all their query blocks are processed for a given table T, i.e., the build up of $ColComb_T$ has finished for given table T, column sets Col(T,Q,B) inside $ColComb_T$ are pruned 508 as seen more fully in the flow diagram of FIG. 8. Column permutations are built and their filters and savings in getpages for each query block B are computed. The purpose of column set pruning is to avoid redundant combinations in the column set permutations that are done in a later step 711. For each column set {$C_1, \ldots, C_n$} out of $ColComb_T$ 701 it is checked whether it is a real subset of another column set {$d_1, \ldots, d_x$} out of $ColComb_T$ 702. If this is true, the element {$C_1, \ldots, C_n$} is removed from $ColComb_T$ 703.

As an example, let {A,B,C}, {A,C} and {D,E} be the elements in $ColComb_T$, the element {A,C} will be removed from $ColComb_T$ because it is a subset of {A,B,C}.

As seen in the flow diagram of FIG. 6, the program then verifies whether there is enough read activity $Getp_T$ left over for all tables T not yet processed. If the remaining read activity is sufficient according to a predefined threshold, the process of building column sets and the calculation of the total savings in getpages on table level for each column set permutation continues for the next table T 501.

The savings $Sav_{T,Q,B,Pe}$ for each permutation Pe and query block B inside every SQL statement Q using table T are known 704. Thus, the total saving $Sav_{T,Pe}$ for table T and each permutation Pe (705) can be computed 706 as:

$$Sav_{T,Pe} = \sum_{i=1}^{n}\sum_{j=1}^{n} Sav_{T,Q_i,B_j,Pe}$$

Figure 7:
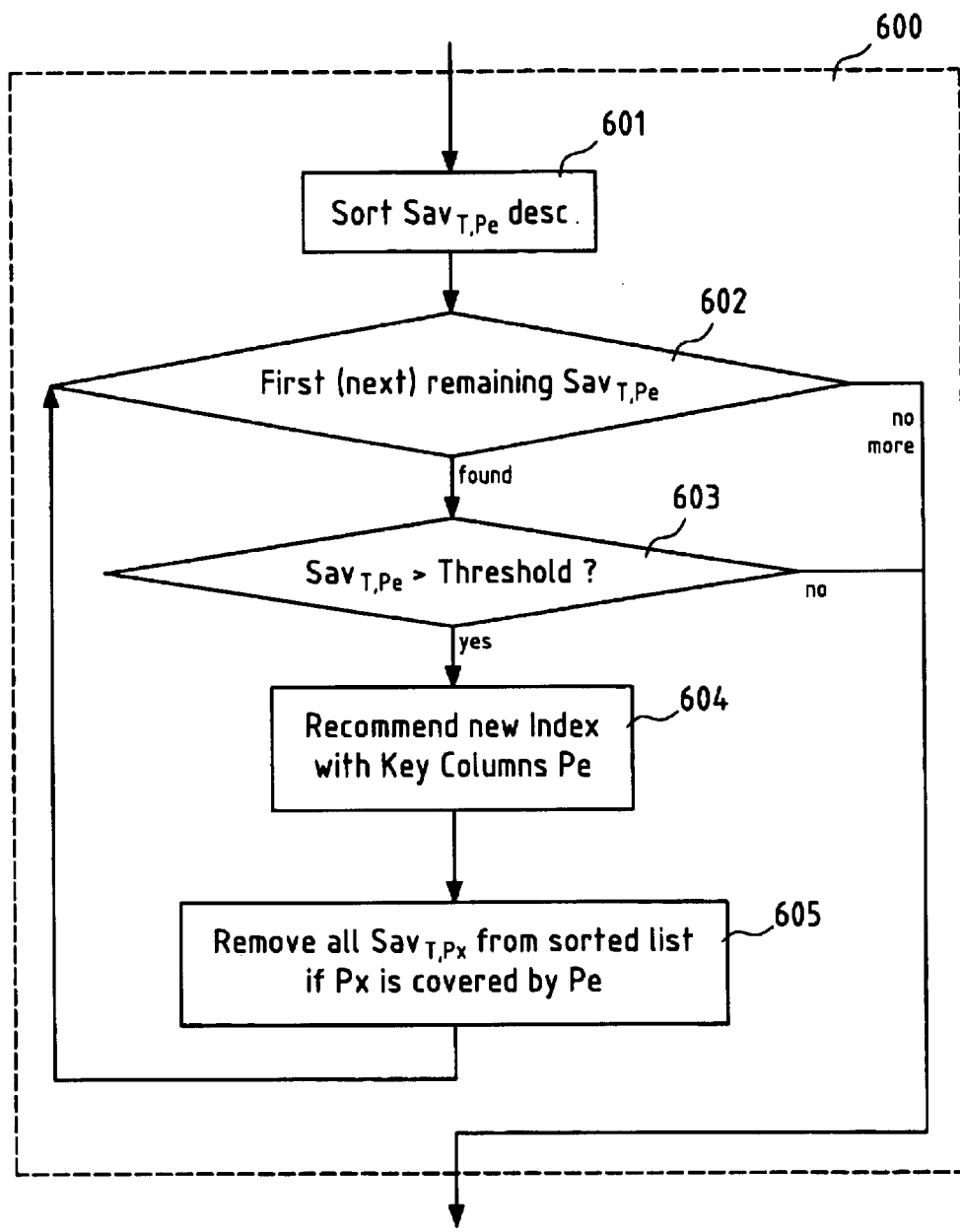
FIG. 7 is a flowchart of the recommendation of new indexes.

The program verifies new indexes are recommended based on the calculated savings $Sav_{T,Pe}$ for all processed tables T as shown in the flow diagram of FIG. 7. First, the savings $Sav_{T,Pe}$ for all permutations Pe and all tables T are sorted in descending order 601, so that the permutations Pe with the highest savings in getpages are first. For each saving $Sav_{T,Pe}$ being processed in sort order 602, it is verified whether it exceeds a predefined threshold value 603. If so, a recommendation is made for a new index with a key Pe=($E_1, \ldots, E_n$). Depending on the getpage activity caused by ORDER BY, MIN and MAX the index key columns $E_1, \ldots, E_n$ are put in either ascending or descending order. To avoid redundant index recommendations, the sorted list is searched for elements $Sav_{T,Px}$ of the same table T where the permutation Px is covered by the index key ($E_1, \ldots, E_n$) just recommended. Such elements $Sav_{T,Px}$ are ignored for further processing and removed from the sorted list 602.

As an example, let (A, B, C) be the key columns of the recommended new index, permutations (A) and (A, B) do not need any further attention and are deleted because they are already covered by index key (A, B, C).

The flowchart 508 of FIG. 8 shows returning the savings $Sav_{T,Q,B,Pe}$ for each permutation Pe and query block B inside every SQL statement Q using table T 704 FIG. 7:

First, for each column set Col(T,Q,B)={$C_1, \ldots, C_n$} inside $ColComb_T$ 710 all column permutations are built 711. As one example, let {A, B, C} be the column set. Then there are 15 column permutations which are (A), (B), (C), (A, B), (A, C), (B, A), (B, C), (C, A), (C, B), (A, B, C), (A, C, B), (B, A, C), (B, C, A), (C, A, B) and (C, B, A).

Then, for each permutation Pe 712, all query blocks B with a column in Table T for any SQL statement Q 713 are processed in the following manner:

1. The filter factor $FF_{T,Q,B,Pe}$ for query block B and permutation Pe and the filter factor $FF_{T,Q,B}$ for the complete query block B are calculated 714.
2. The getpage number $Getp_{T,Q,B}$ on query block level B is calculated based on $FF_{T,Q,B}$ 715.
3. Depending on the current index usage 716, 717 of query block B, the savings $Sav_{T,Q,B,Pe}$ for permutation Pe is computed 718, 719, 720.

For each predicate set Pred(T,Q,B) and its concatenations (modified as described in FIG. 4), the overall filter factor $FF_{T,Q,B}$ is calculated using the following boolean AND and OR rule:

Filter factors of predicates that are concatenated with an AND will be multiplied.

Filter factors of predicates that are concatenated with an OR will be added and the product of both filter factors is subtracted.

Filter factors of predicate expressions in inner brackets are computed first.

The above rule will be referenced in the following description as $Rule_{ANDandOR}$. As a continuation of the example already given, let a predicate expression be A=1 AND B=5 OR D=1 where A, B and D are all columns of table T. Let FFa, FFb and FFd be the filter factors of the columns A, B and D. Then $FF_{T,Q,B}$ is computed as ((FFa*FFb)+FFd)−((FFa*FFb)*FFd). In the next step, only those predicates and concatenations are kept in the predicate expression that contain a column in permutation Pe. All others are set to TRUE and removed using boolean rules. The filter factor $FF_{T,Q,B,Pe}$ is now calculated using $Rule_{ANDandOR}$. Note that expressions in inner brackets are evaluated first. In the above example, let (A, D) be the permutation Pe. Then predicate expression A=1 AND B=5 OR D=1 equates to an expression A=1 OR D=1 and filter factor $FF_{T,Q,B,Pe}$ is computed as FFa+FFd−(FFa*FFd).

The number of getpages $Getp_{T,Q,B}$ for table T and query block B in SQL statement Q is computed as:

$$Getp_{T,Q,B} = Getp(T,Q) * \frac{FF_{T,Q,B}}{\sum_{i=1}^{n} FF_{T,Q,Bi}}$$

where Bi are the query blocks in SQL statement Q.

The savings $Sav_{T,Q,B,Pe}$ for permutation Pe is calculated in one of the following three ways:

Formula 1:

The query block B currently uses a matching index access 718:

$$Sav_{T,Q,B,Pe} = \frac{Getp_{T,Q,B}}{FilterFactorI} * (1 - FF_{T,Q,B,Pe})$$

where FilterFactorI stands for the filter factor of the used index. It is calculated for a specific query block B with the same AND and OR rule already described. Assume $Pred_i$ are the predicates in query block B with columns covered by the index, then the FilterFactorI is calculated as follows:

FilterFactorI=$Rule_{ANDandOR}$[FF(Pred$_1$) Concat(Pred$_2$) FF(Pred$_2$) ... FF(Pred$_{n-1}$) Concat(Pred$_n$) FF(Pred$_n$)]

where FF(Pred$_i$) are the filter factors of Pred$_i$ and Concat (Pred$_{i+1}$) are the concatenations AND and OR to the next predicate Pred$_{i+1}$.

Formula 2:

The query block B currently uses a non-matching index access 719:

$Sav_{T,Q,B,Pe}=(Getp_{T,Q,B}+Getp(I,Q))*(1-FF_{T,Q,B,Pe})$ where Getp(I,Q) is the number of index getpages. Normally, Getp(I,Q) exceeds $Getp_{T,Q,B}$ by far and will be theoretically eliminated by a new index with matching access.

Formula 3:

The query block B does not currently use any index 716, i.e., uses a table space scan 720:

$Sav_{T,Q,B,Pe}=Getp_{T,Q,B}*(1-FF_{T,Q,B,Pe})$

All permutations Pe 712 are processed for all column sets Col(T,Q,B)={$C_1, \ldots, C_n$} inside $ColComb_T$ 710. Now, the total saving $Sav_{T,Pe}$ for table T and permutation Pe can be computed as the sum of all $Sav_{T,Q,B,Pe}$ 706.

Figure 10:
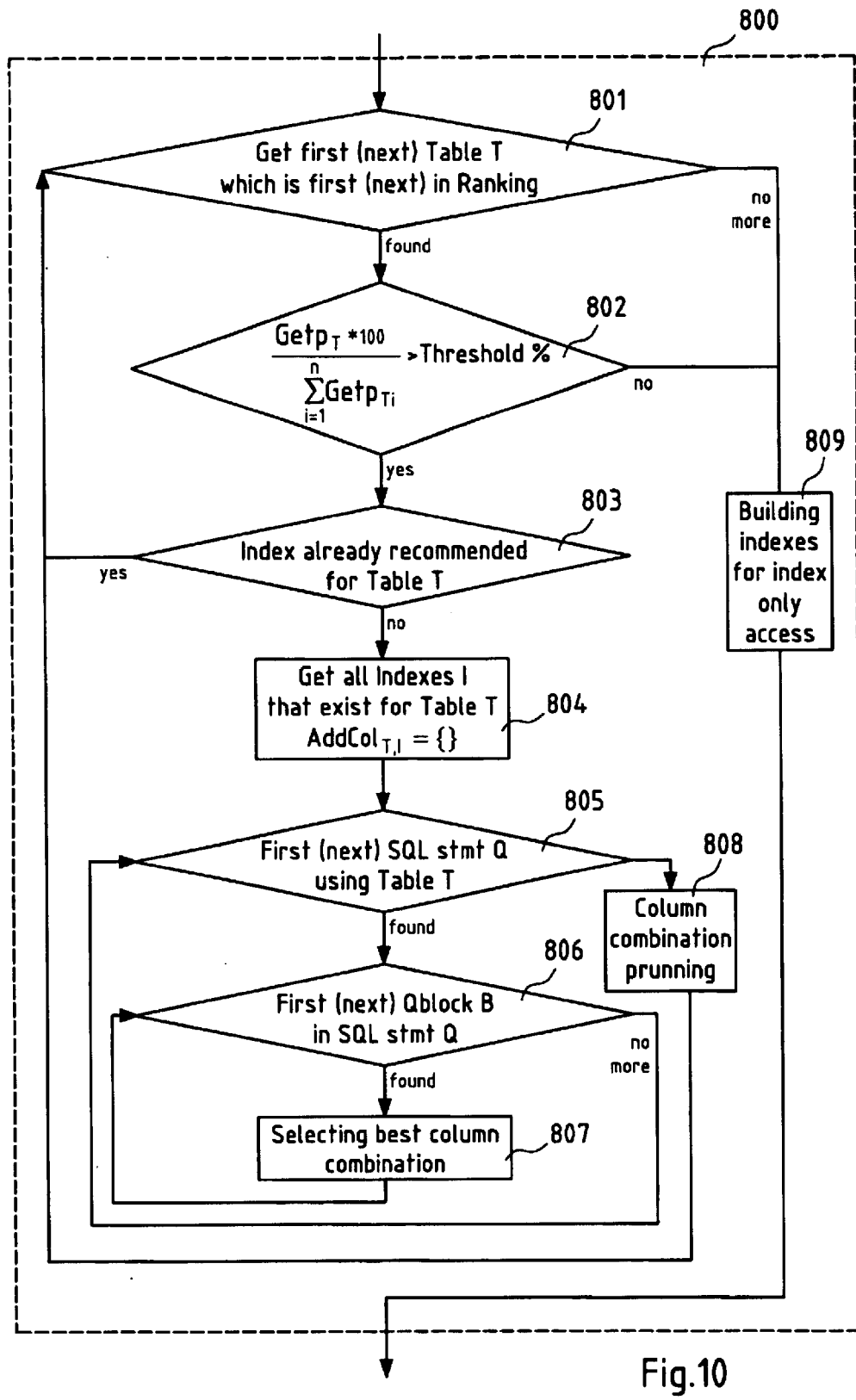
FIG. 10 is a flowchart showing the decision taking path for index recommendations that support index only access.
Figure 11:
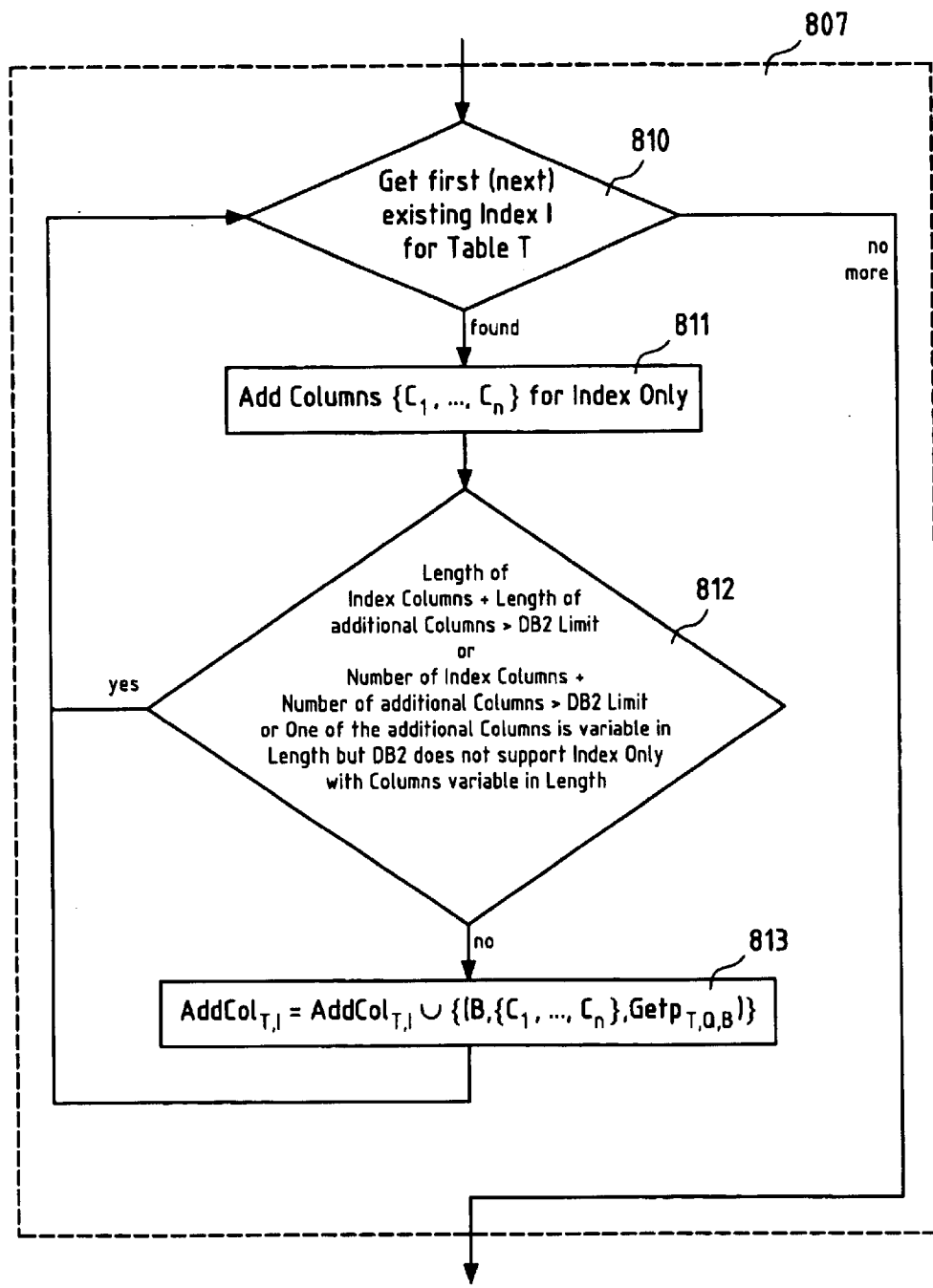
FIG. 11 is a flowchart of building the best column combinations to be added to existing indexes for index only access.
Figure 12:
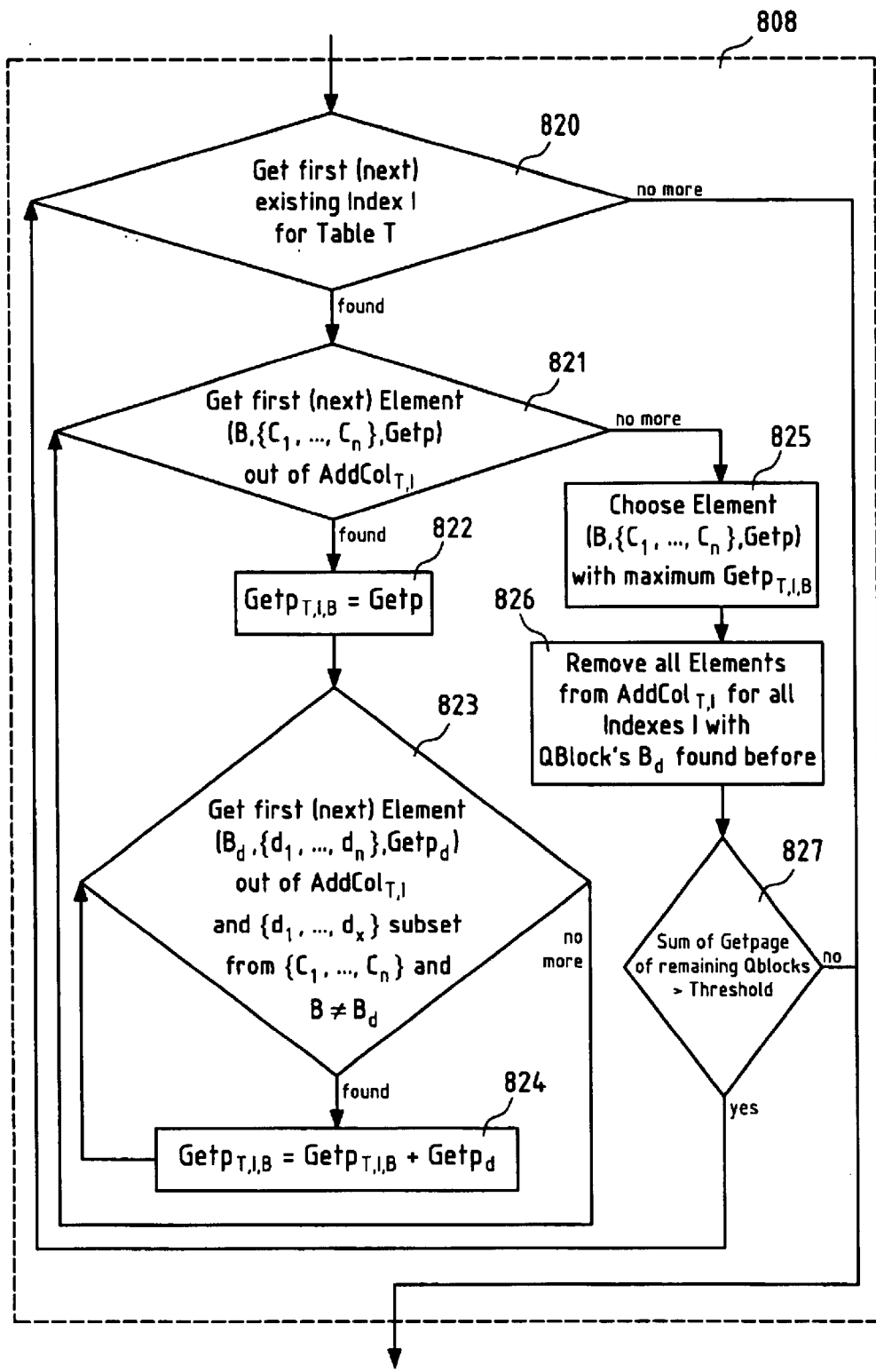
FIG. 12 is a flowchart of column combination pruning.

The final steps in the XOP program is shown in flowchart of FIGS. 10–12 where recommendations are made for new or extended indexes which allow index only access results for selected SQL statements. Index only access means that SQL statements are solely processed by retrieving index pages. No pages have to be read on the table level because all SQL statement columns are part of the index.

Figure 13:
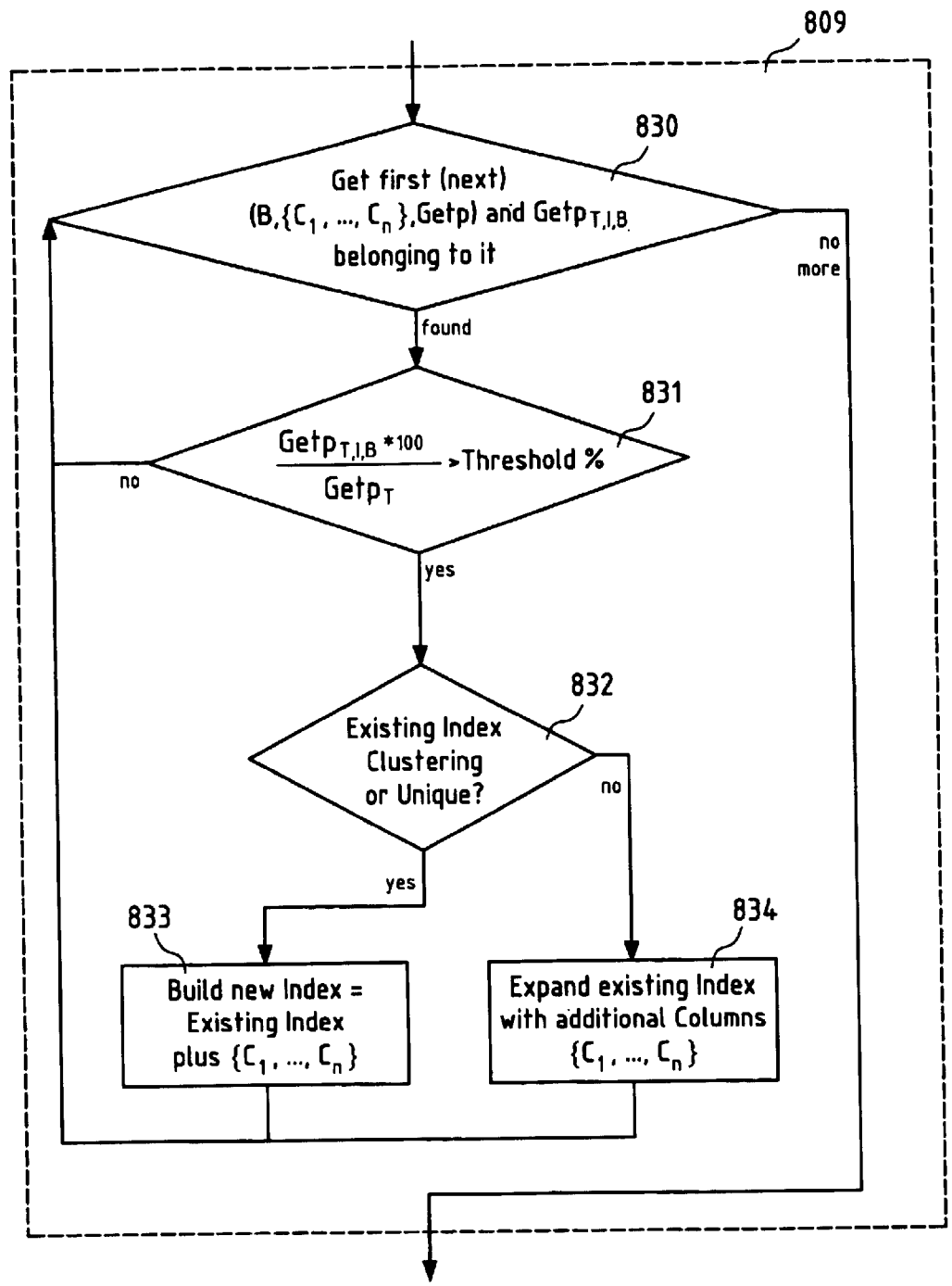
FIG. 13 is a flowchart of building indexes for index only access.

First, each table T being processed in ranking order 801 is checked whether its read activity $Getp_T$ exceeds the total read activity of all tables by a predefined threshold percentage 802. If this threshold is not reached, this table T and all tables that follow table T in ranking order are not considered any further and processing continues with flowchart FIG. 13 809. Otherwise, if the read activity on table T is still sufficient, there should be no index recommendation already made for this table T by the XOP program 803. If this is true, all existing indexes I for table T are retrieved (804) and sets $AddCol_{T,I}$ are initialized to "empty" for table T and all indexes I.

A set $AddCol_{T,I}$ will store elements (B,{$C_1, \ldots, C_n$}, $Getp_{T,Q,B}$) which represent the column combination {$C_1, \ldots, C_n$} and its savings $Getp_{T,Q,B}$ in getpages for a query block B 805 inside SQL statements Q using table T (806) that is to be added to index I for index only access. The construction of $AddCol_{T,I}$ is illustrated in flowchart FIG. 11 where all indexes 810 are investigated for query block B which columns {$C_1, \ldots, C_n$} are to be added 811 to the index key for index only access. If the total length and the total number of the index key and additional columns do not exceed DB2 limits and if DB2 supports index only access for any additional column variable in length 812, then the column combination {$C_1, \ldots, C_n$} is stored together with its savings in set $AddCol_{T,I}$ 813 for index I and table T, i.e., $AddCol_{T,I}=AddCol_{T,I} \cup \{(B,\{C_1, \ldots, C_n\},Getp_{T,Q,B})\}$. When all indexes I are checked for query block B (810), processing returns to flowchart FIG. 8 807.

As an example, let the columns of table T be A, B, C, D, E, F, G, and H. Let the 3 indexes on this table be:

| Index: | $I_1$ | $I_2$ | $I_3$ |
|---|---|---|---|
| Key: | (B, C) | (D, G) | (E) |

Furthermore, let the columns of 6 query blocks with columns in T be COL(T,Q,B$_1$)={B, C, D}, COL(T,Q,B$_2$)={B, D, G}, COL(T,Q,B$_3$)={B, C, F}, COL(T,Q,B$_4$)={B, C, D}, COL(T,Q,B$_5$)={B, C, D, E, F}, and COL(T,Q,B$_6$)={F}. Then, the sets $AddCol_{T,I1}$, $AddCol_{T,I2}$, and $AddCol_{T,I3}$ will contain the following elements:

| | $AddCol_{T,I1}$ | $AddCol_{T,I2}$ | $AddCol_{T,I3}$ |
|---|---|---|---|
| {B, C, D}: | (B$_1$, {D}, 30) | | |
| {B, D, G}: | | (B$_2$, {B}, 70) | |
| {B, C, F}: | (B$_3$, {F}, 10) | | |
| {B, C, D}: | (B$_4$, {D}, 20) | | |
| {B, C, D, E, F}: | (B$_5$, {D, E, F}, 30) | | (B$_5$, {B, C, D, F}, 10) |
| {F}: | | | |

When the sets $AddCol_{T,I}$ are built for a given table T and all its indexes I 805, processing continues with flowchart FIG. 12 808 where the column combination found before is pruned. Here, for each index I on table T 820, each element (B,{$C_1, \ldots, C_n$},Getp) inside $AddCol_{T,I}$ is checked 821 whether {$C_1, \ldots, C_n$} covers any other element inside $AddCol_{T,I}$ 823, i.e., {$d_1, \ldots, d_n$} is a subset of {$C_1, \ldots, C_n$} and (B$_d$,{$d_1, \ldots, d_n$},Getp$_d$)∈$AddCol_{T,I}$. If this is true, the read activity Getp$_d$ is added to the overall savings $Getp_{T,I,B}$ that an index I on table T will have if columns {$C_1, \ldots, C_n$} are added to its index key 824. The overall savings $Getp_{T,I,B}$ is initially set to Getp 822.

For a given table T and index I, the element (B, {$C_1, \ldots, C_n$},Getp) with the maximum $Getp_{T,I,B}$ finally remains in $AddCol_{T,I}$ 825 and all $AddCol_{T,I}$ elements for other query blocks B$_d$ covered by {$C_1, \ldots, C_n$} are removed from $AddCol_{T,I}$. Furthermore, all elements for query blocks B and B$_d$ are removed from the sets $AddCol_{T,Ix}$ for any other Index Ix 826.

Processing returns to flowchart FIG. 10 at 808 if all indexes I on table T are checked 820 or the sum of getpages in the remaining query blocks is below a predefined threshold 827.

When all tables are processed 801 or the read activity $Getp_T$ of the next table T does not exceed the total read activity of all tables by a predefined threshold percentage 802, processing continues with flowchart FIG. 83 809. Here the indexes are recommended that support index only access. For every element (B,{$C_1, \ldots, C_n$},Getp) out of $AddCol_{T,I}$ and its overall savings $Getp_{T,I,B}$ 830, it is checked whether Getp$_{T,I,B}$ exceeds the read activity Getp$_T$ of table T by predefined threshold 831. If the savings Getp$_{T,I,B}$ are not sufficient, the next element (B,{C$_1$, . . . , C$_n$},Getp) is checked 830. Otherwise, it is decided whether a new index should be built with a key containing the columns copied from the existing index I plus the columns {C$_1$, . . . , C$_n$} 833 or whether the columns {C$_1$, . . . , C$_n$} should be just added to the existing index I 834. To avoid changes to the data model, the recommendation for a new index is always made if the existing index is unique or clustering 832. Otherwise, recommendations are made to modify the existing index 834.

The recommendations can then be used to create a indexes in the production database 17 which are accordingly optimized based on getpage work load.

It is understood that the present embodiments described above are to be considered as illustrative and not restrictive. It will be obvious to those skilled in the art to make various changes, alterations and modifications to the invention described herein. To the extent that these variations, modifications and alterations depart from the scope and spirit of the appended claims, they are intended to be encompassed therein.

What is claimed is:

1. A method for selecting optimized indexes for a relational database, comprising:
   (a) collecting data about all database queries in a representative time interval;
   (b) determining database tables which have been queried during the representative time period so as to have triggered activity above a predetermined amount;
   (c) computing an optimized index set based on table read/change activity; and
   (d) recommending the optimized index set to a user.

2. The method of claim 1, wherein the data about the database queries is determined by running a trace on all database queries in said representative time interval, the trace includes determining the frequency of execution and the read/change activity on each table and each index for each query traced.

3. The method of claim 2, wherein the potential indexes are computed for each such table including the following factors:
   (a) the table read/change activity of all queries accessing this table;
   (b) the filter factors of the predicates of all queries accessing this table;
   (c) the predicate properties of being indexable for all queries accessing this table; and
   (d) the query access paths of all queries accessing this table.

4. The method of claim 1, wherein the queries comprise SQL queries.

5. The method of claim 1, wherein the read/change activity comprises getpage workload activity.

6. The method of claim 1, wherein the optimized index set is determined by computing the potential savings in read activity of potential index column combination for all query invocations on each table having a read activity above a predetermined level.

7. The method of claim 1, wherein tables with a high change activity are not considered for index recommendation if the potential index overhead exceeds the benefits in table read activity savings.

8. The method of claim 1, wherein indexes are expanded for index only access to eliminate table read activity.

9. The method of claim 1, wherein the database comprises a DB2 database.

10. An apparatus for determining an optimized index set for a database, comprising:
    (a) one or more processors; and
    (b) a memory coupled to the one or more processors and containing one or more sequences of one or more instructions which, when executed by the one or more processors, cause the one or more processors to perform the steps of:
       (i) collecting data about all database queries in a representative time interval;
       (ii) determining database tables which have been queried during the representative time period so as to have triggered activity above a predetermined amount;
       (iii) computing an optimized index set based on table read/change activity; and
       (iv) recommending the optimized index set to a user.

11. The apparatus of claim 10, wherein the data about the database queries is determined by running a trace on all database queries in said representative time interval, the trace includes determining the frequency of execution and the read/change activity on each table and each index for each query traced.

12. The apparatus of claim 10, wherein the queries comprise SQL queries.

13. The apparatus of claim 10, wherein the read/change activity comprises getpage workload activity.

14. The apparatus of claim 10, wherein the optimized index set is determined by computing the potential savings in read activity of potential index column combination for all query invocations on each table having a read activity above a predetermined level.

15. The apparatus of claim 10, wherein the potential indexes are computed for each such table including the following factors:
    (e) the table read/change activity of all queries accessing this table;
    (f) the filter factors of the predicates of all queries accessing this table;
    (g) the predicate properties of being indexable for all queries accessing this table; and
    (h) the query access paths of all queries accessing this table.

16. The apparatus of claim 10, wherein indexes are expanded for index only access to eliminate table read activity.

17. The apparatus of claim 10, wherein the database comprises a DB2 database.

18. A computer-readable medium carrying one or more sequences of one or more instructions for determining, in a relational database management system, an optimized set of database indexes, the one or more sequences of one or more instructions including instructions which, when executed by one or more processors, cause the one or more processors to perform the steps of:
    (i) collecting data about all database queries in a representative time interval;
    (ii) determining database tables which have been queried during the representative time period so as to have triggered activity above a predetermined amount;
    (iii) computing an optimized index set based on table read/change activity; and
    (iv) recommending the optimized index set to a user.

19. The medium of claim 18, wherein the data about the database queries is determined by running a trace on all database queries in said representative time interval, the trace includes determining the frequency of execution and the read/change activity on each table and each index for each query traced.

20. The medium of claim 18, wherein the queries comprise SQL queries.

21. The medium of claim 18, wherein the read/change activity comprises getpage workload activity.

22. The medium of claim 18, wherein the optimized index set is determined by computing the potential savings in read activity of potential index column combination for all query invocations on each table having a read activity above a predetermined level.

23. The medium of claim 18, wherein the potential indexes are computed for each such table including the following factors:

(i) the table read/change activity of all queries accessing this table;

(j) the filter factors of the predicates of all queries accessing this table;

(k) the predicate properties of being indexable for all queries accessing this table; and (l) the query access paths of all queries accessing this table.

24. The medium of claim 18, wherein indexes are expanded for index only access to eliminate table read activity.

25. The medium of claim 18, wherein the database comprises a DB2 database.

* * * * *